US012697689B2

(12) United States Patent
Hou et al.

(10) Patent No.: US 12,697,689 B2
(45) Date of Patent: Aug. 4, 2026

(54) VISUAL LASER ENGRAVING MACHINE

(71) Applicant: SHENZHEN HANQINGDA TECHNOLOGY CO., LTD., Shenzhen (CN)

(72) Inventors: Shoushan Hou, Shenzhen (CN); Zhihuan Liu, Shenzhen (CN); Xiangying Chen, Shenzhen (CN)

(73) Assignee: SHENZHEN HANQINGDA TECHNOLOGY CO., LTD., Shenzhen (CN)

( * ) Notice: Subject to any disclaimer, the term of this patent is extended or adjusted under 35 U.S.C. 154(b) by 622 days.

(21) Appl. No.: 18/265,189

(22) PCT Filed: Dec. 21, 2022

(86) PCT No.: PCT/CN2022/140535
§ 371 (c)(1),
(2) Date: Jun. 2, 2023

(87) PCT Pub. No.: WO2023/169043
PCT Pub. Date: Sep. 14, 2023

(65) Prior Publication Data
US 2024/0391034 A1 Nov. 28, 2024

(30) Foreign Application Priority Data
Mar. 10, 2022 (CN) .......................... 202220530684.6

(51) Int. Cl.
B23K 37/04 (2006.01)
B23K 26/36 (2014.01)
B23K 37/02 (2006.01)

(52) U.S. Cl.
CPC .......... B23K 37/0435 (2013.01); B23K 26/36 (2013.01); B23K 37/0235 (2013.01)

(58) Field of Classification Search
CPC .............. B23K 37/0538; B23K 26/042; B23K 26/0876; B23K 37/0276; B23K 26/0665;
(Continued)

(56) References Cited

U.S. PATENT DOCUMENTS

2021/0121985 A1* 4/2021 Rubens .............. B23K 37/0538

FOREIGN PATENT DOCUMENTS

| CN | 110877225 A | 3/2020 |
| CN | 210633119 | 5/2020 |

(Continued)

OTHER PUBLICATIONS

International Search Report in International Application No. PCT/CN2022/140535 dated Mar. 2, 2023.

(Continued)

*Primary Examiner* — Phuong T Nguyen
(74) *Attorney, Agent, or Firm* — Quarles & Brady LLP

(57) ABSTRACT

A visual laser engraving machine includes a bottom plate, clamping assemblies and a product body. A portal frame is disposed around a surface of the bottom plate. An electrically controlled pulley is slidably connected with a horizontal slide rail at an inner side thereof. A laser device is slidably connected between longitudinal slide rails. A lower slide rail is arranged at a middle of the surface of the bottom plate. The clamping assemblies are slidably connected with the lower slide rail at an inner side of the lower slide rail and each includes a control pulley, electric push rods, a servo motor and miniature push rods. The product body is placed between the miniature push rods.

7 Claims, 2 Drawing Sheets

(58) Field of Classification Search
CPC .... B23K 26/128; B23K 26/38; B23K 26/362;
B23K 26/0823; B23K 26/0096; B23K
2101/04; B23K 37/0435; B23K 26/36;
B23K 37/0235
USPC ............ 219/121.39, 121.67, 121.68, 121.78,
219/121.6
See application file for complete search history.

(56) References Cited

FOREIGN PATENT DOCUMENTS

| | | |
|---|---|---|
| CN | 211220394 | 8/2020 |
| CN | 211661786 | 10/2020 |
| CN | 212398513 | 1/2021 |
| CN | 213794894 | 7/2021 |
| CN | 213827934 | 7/2021 |
| CN | 215468846 | 1/2022 |
| CN | 217193306 | 8/2022 |
| JP | 2013022611 A | 2/2013 |
| WO | 2021201487 A1 | 10/2021 |

OTHER PUBLICATIONS

Written Opinion of the International Search Authority in International Application No. PCT/CN2022/140535 dated Mar. 2, 2023.

* cited by examiner

VISUAL LASER ENGRAVING MACHINE

CROSS-REFERENCE TO RELATED APPLICATIONS

This application is a national stage filing under 35 U.S.C. § 371 of international application number PCT/CN2022/140535, filed Dec. 21, 2022, which claims priority to Chinese patent application No. 202220530684.6 filed Mar. 10, 2022. The contents of these applications are incorporated herein by reference in their entirety.

TECHNICAL FIELD

Embodiments of the disclosure relate to the technical field of laser engraving machines, and specifically to a visual laser engraving machine.

BACKGROUND

A so-called laser engraving machine engraves permanent marks on the surface of materials or inside transparent materials by means of laser beams. The laser beams may produce chemical effects and physical effects on materials. Physical or chemical reaction occurs after the materials absorb laser light instantly, thereby engraving marks or displaying patterns or characters. Therefore, the laser engraving machine is also called laser marking machine and laser carving machine.

For existing laser engraving machines, when in use, a product needs to be clamped and fixed first. When multiple surfaces of the product are to be engraved, the product needs to be rotated so that different surfaces face the laser device. However, the surface to be engraved of the product turned over is inconsistent with the previously engraved surface in height, which easily affects effect presentation after engraving. For this reason, embodiments of the disclosure provide a visual laser engraving machine.

SUMMARY

Embodiments of the disclosure provide a visual laser engraving machine to solve the problems mentioned in the above background section.

To achieve the above object, the embodiments of the disclosure provide a visual laser engraving machine, including a bottom plate, clamping assemblies and a product body, where a portal frame is disposed around a surface of the bottom plate, and a horizontal slide rail is arranged on an inner side of a top of the portal frame: an electrically controlled pulley is slidably connected with the horizontal slide rail at an inner side of the horizontal slide rail, and longitudinal slide rails are fixed on a bottom of the electrically controlled pulley: a laser device is slidably connected between the longitudinal slide rails, and an infrared distance meter is arranged on an outer side surface of the laser device: a lower slide rail is arranged at a middle of the surface of the bottom plate: the clamping assemblies are slidably connected with the lower slide rail at an inner side of the lower slide rail and are configured for adjusting a height of a surface to be engraved of a product: each of the clamping assemblies includes a control pulley, electric push rods, a servo motor and miniature push rods, where the electric push rods are fixed on a surface of the control pulley, the servo motor is fixed on tops of the electric push rods, and the miniature push rods are arranged on upper and lower sides of an end of the servo motor; and the product body is placed between the miniature push rods.

Further, the laser device and the infrared distance meter are arranged perpendicular to the bottom plate, and the bottom plate is arranged parallel to all of the horizontal slide rail, the longitudinal slide rails and the servo motors.

Further, the miniature push rods are symmetrically distributed about a horizontal central axis of the servo motor, and there are totally four miniature push rods provided.

Further, the product body is rotatably connected to the servo motors through the miniature push rods, and the servo motors are symmetrically distributed about a vertical central axis of the bottom plate.

Further, the infrared distance meter and the laser device are slidably connected to the longitudinal slide rails and the horizontal slide rail through the electrically controlled pulley, and the infrared distance meter is in clamping connection with the laser device.

Further, a first fan is arranged on an upper surface of the top of the portal frame, and the top of the portal frame is of a mesh-shaped structure.

Further, an activated carbon plate is inserted into the bottom plate, and a second fan is arranged at a bottom of the bottom plate.

Compared with the prior art, the embodiments of the disclosure have the following beneficial effects.

After the product body is turned over, the distance between the laser device and the surface of the product body is measured, the product body is driven by the electric push rods to ascend or descend with all faces of the product body located in the same height horizontal plane during engraving, and smoke generated during engraving is blown downwards by the first fan and the second fan so that the smoke sinks and penetrates through the activated carbon plate to be adsorbed and filtered, which is beneficial to preventing the smoke from floating upwards and being absorbed by human bodies.

1. In the embodiments of the disclosure, the product body is clamped by the miniature push rods and is turned over by the servo motors. After the product body is turned over, the distance between the laser device and the surface of the product body is measured by the infrared distance meter, and the product body is driven by the electric push rods to ascend or descend, so that all faces of the product body are located on the same height horizontal plane during engraving, which is beneficial to solving the problem that effect presentation after engraving is affected as the heights of the engraved surfaces are not consistent.

2. In the embodiments of the disclosure, one side of the product body is clamped by the miniature push rods. There are totally two groups of the miniature push rods provided, with two in each group. When the left side of the product body is clamped, the right side thereof is not clamped, so that the laser device can engrave the right side of the surface of the product body. Then, the right side of the product body is clamped, and at the time, the laser device can slide to engrave the left side of the surface of the product body. According to the arrangement, it is beneficial to comprehensively engraving the product body by replacing the clamping position of the product body.

3. In the embodiments of the disclosure, smoke will be generated when the surface of the product body is laser-engraved by the laser device. At this time, the first fan and the second fan blow downwards, so that the smoke sinks and penetrates through the activated carbon plate, and the activated carbon plate adsorbs and filters dust particles in the smoke. The arrangement is beneficial to preventing the smoke from floating upwards and being absorbed by human bodies. Moreover, the activated carbon plate is inserted into the bottom plate, which is convenient for later disassembly and replacement of the activated carbon plate.

In the figures: 1, bottom plate; 2, portal frame; 3, horizontal slide rail; 4, electrically controlled pulley; 5, longitudinal slide rail; 6, laser device; 7, infrared distance meter; 8, lower slide rail; 9, clamping assembly; 901, control pulley; 902, electric push rod; 903, servo motor; 904, miniature push rod; 10, product body; 11, first fan; 12, activated carbon plate; and 13, second fan.

DETAILED DESCRIPTION

Figure 1:
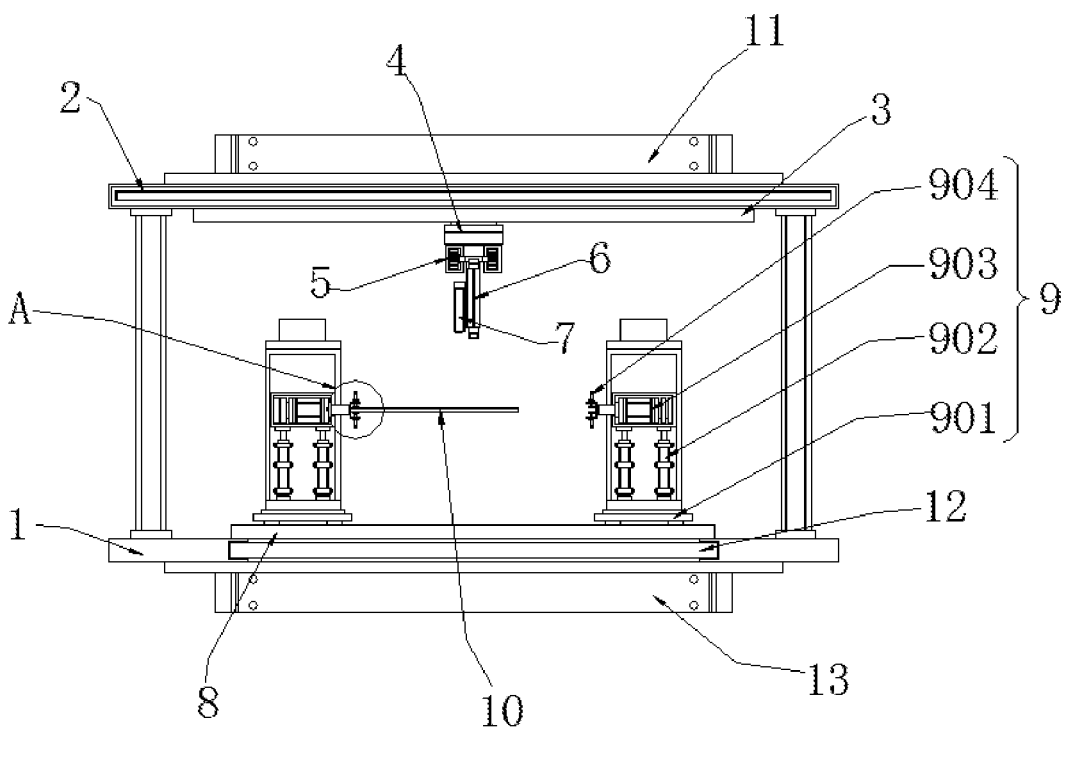
FIG. 1 is a front view according to the embodiments of the disclosure.
Figure 2:
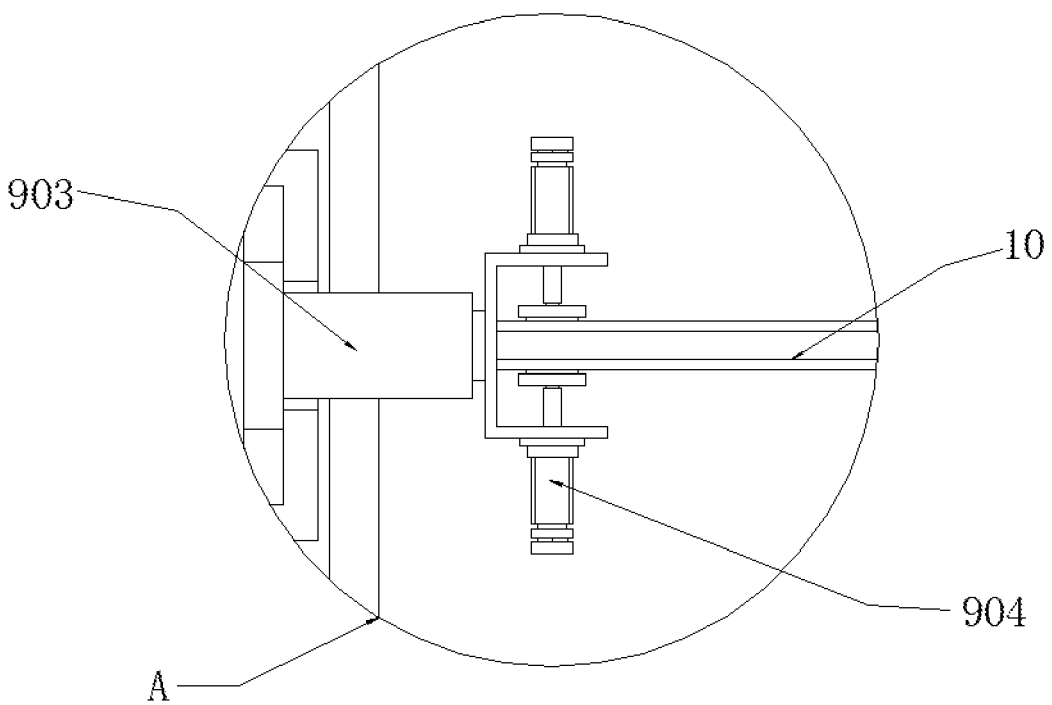
FIG. 2 is an enlarged view of part A in FIG. 1 according to the embodiments of the disclosure.
Figure 3:
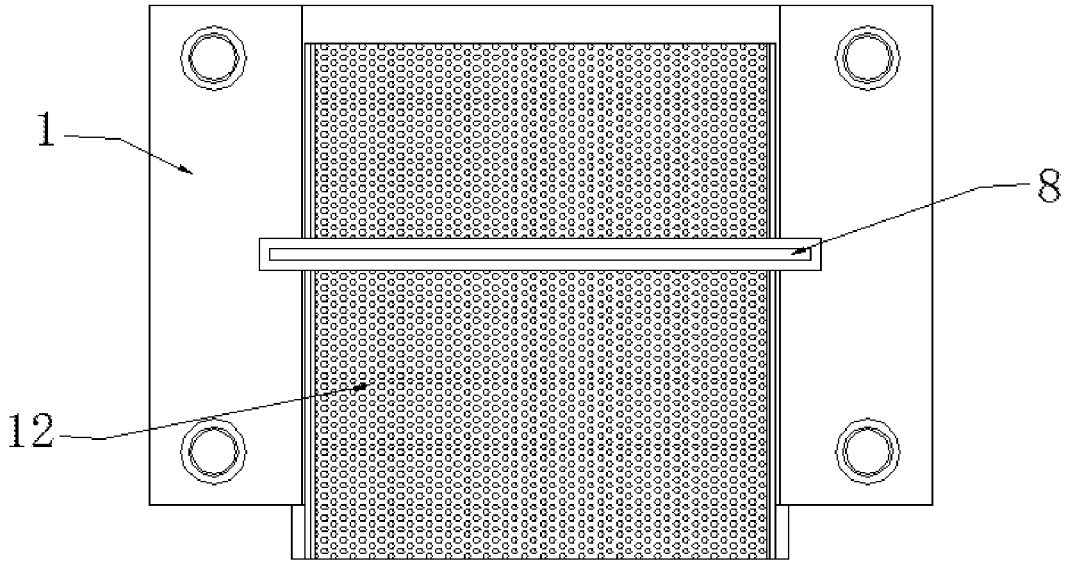
FIG. 3 is a top view of a bottom plate according to the embodiments of the disclosure.

As shown in FIGS. 1-2, a visual laser engraving machine includes a bottom plate 1, a clamping assemblies 9 and a product body 10, where a portal frame 2 is disposed around a surface of the bottom plate 1, and a horizontal slide rail 3 is arranged on an inner side of a top of the portal frame 2. An electrically controlled pulley 4 is slidably connected with the horizontal slide rail at an inner side of the horizontal slide rail 3, and a longitudinal slide rails 5 are fixed on a bottom of the electrically controlled pulley 4. A laser device 6 is slidably connected between the longitudinal slide rails 5, and an infrared distance meter 7 is arranged on an outer side surface of the laser device 6. A lower slide rail 8 is arranged on a middle of the surface of the bottom plate 1. The clamping assemblies 9 are slidably connected with the lower slide rail at an inner side of the lower slide rail 8 and are configured for adjusting a height of a surface to be engraved of a product. Each clamping assembly 9 includes a control pulley 901, electric push rods 902, a servo motor 903 and miniature push rods 904, where the electric push rods 902 are fixed on a surface of the control pulley 901, the servo motor 903 is fixed on a top of the electric push rods 902, and the miniature push rods 904 are arranged on upper and lower sides of an end of the servo motor 903. The product body 10 is placed between the miniature push rods 904. The laser device 6 and the infrared distance meter 7 are arranged perpendicular to the bottom plate 1, and the bottom plate 1 is arranged parallel to all of the horizontal slide rail 3, the longitudinal slide rails 5 and the servo motors 903. Each group of the miniature push rods 904 are symmetrically distributed about a horizontal central axis of the servo motor 903, and there are totally four miniature push rods 904 provided. The product body 10 is rotatably connected to the servo motors 903 through the miniature push rods 904, and the servo motors 903 are symmetrically distributed about a vertical central axis of the bottom plate 1.

The visual laser engraving machine is specifically operated as follows. The left side of the product body 10 is located between one group of the miniature push rods 904, and the miniature push rods 904 stretch out simultaneously to clamp the product body 10. At this time, the product body 10 is arranged parallel to the bottom plate 1 and perpendicular to the laser device 6. The distance between the laser device 6 and an upper surface of the product body 10 is measured by the infrared distance meter 7, and then the servo motors 903 are pushed by the electric push rods 902 to ascend or descend to adjust the height of the upper surface of the product body 10, which makes the distance between the upper surface of the product body 10 and the laser device 6 optimal. Then, the laser device 6 operates to engrave the upper surface of the product body 10. Specifically, a right side area of the upper surface of the product body 10 is engraved first, and after the right side area is engraved, the servo motors 903 start to make the product body 10 rotate by 90°, so that the other face of the product body 10 faces upwards to become the upper surface. At this time, the distance between the laser device 6 and the upper surface of the product body 10 is then measured by the infrared distance meter 7, the height of the upper surface of the product body 10 is adjusted by the electric push rods 902, and the right side of the upper surface is engraved after adjustment. After the right side areas of all surfaces of the product body 10 are engraved, the other group of miniature push rods 904 get close to the right side of the product body 10 along the lower slide rail 8 through the control pulley 901 and clamp the product body 10. At this time, the miniature push rods 904 on the left side of the product body 10 loosen to unclamp and get away through the control pulley 901, and next, the laser device 6 engraves the left side areas of all surfaces of the product body 10.

As shown in FIG. 1, the infrared distance meter 7 and the laser device 6 are slidably connected to the longitudinal slide rails 5 and the horizontal slide rail 3 through the electrically controlled pulley 4, and the infrared distance meter 7 is in clamping connection with the laser device 6.

Specific operations are as follows. The laser device 6 slides back and forth along the interior of the longitudinal slide rails 5 through the electrically controlled pulley at the top thereof, and meanwhile, the longitudinal slide rails 5 slide left and right along the interior of the horizontal slide rail 3 through the electrically controlled pulley 4, so that the laser device 6 carrying the infrared distance meter 7 moves horizontally above the product body 10, and thus, the infrared distance meter 7 measures the distance between the laser device 6 and the upper surface of the product body 10. The infrared distance meter 7 is in clamping connection with the laser device 6. The infrared distance meter 7 may be pushed upwards hard in later period to be separated from the laser device 6, which is convenient for later maintenance and replacement.

As shown in FIG. 1, a first fan 11 is arranged on an upper surface of the top of the portal frame 2, and the top of the portal frame 2 is of a mesh-shaped structure. An activated carbon plate 12 is inserted into the bottom plate 1, and a second fan 13 is arranged at a bottom of the bottom plate 1.

Specific operations are as follows. Smoke will be generated when the surface of the product body 10 is laser-engraved by the laser device 6. At the time, the first fan 11 and the second fan 13 blow downwards, so that the smoke sinks and penetrates through the activated carbon plate 12, and the activated carbon plate 12 adsorbs and filters dust particles in the smoke. The arrangement is beneficial to preventing the smoke from floating upwards and being absorbed by human bodies. Moreover, the activated carbon plate 12 is inserted into the bottom plate 1, which is convenient for later disassembly and replacement of the activated carbon plate 12.

The working principle is as follows. During the use of the visual engraving machine, first of all, the left side of the product body 10 is located between one group of the miniature push rods 904, and the miniature push rods 904 stretch out simultaneously to clamp the product body 10. At this time, the product body 10 is arranged parallel to the bottom plate 1 and perpendicular to the laser device 6:

Then, the laser device 6 slides back and forth along the interior of the longitudinal slide rails 5 through the electrically controlled pulley at the top thereof, and meanwhile, the longitudinal slide rails 5 slides left and right along the interior of the horizontal slide rail 3 through the electrically controlled pulley 4, so that the laser device 6 carrying the infrared distance meter 7 moves horizontally above the product body 10, and thus, the infrared distance meter 7 measures the distance between the laser device 6 and the upper surface of the product body 10.

The distance between the laser device 6 and an upper surface of the product body 10 is measured by the infrared distance meter 7, and then the servo motors 903 are pushed by the electric push rods 902 to ascend or descend to adjust the height of the upper surface of the product body 10, which makes the distance between the upper surface of the product body 10 and the laser device 6 optimal.

Then, the laser device 6 operates to engrave the upper surface of the product body 10. Specifically, a right side area of the upper surface of the product body 10 is engraved first, and after the right side area is engraved, the servo motors 903 start to make the product body 10 rotates by 90°, so that the other face of the product body 10 faces upwards to become the upper surface. At this time, the distance between the laser device 6 and the upper surface of the product body 10 is then measured by the infrared distance meter 7, the height of the upper surface of the product body 10 is adjusted by the electric push rods 902, and the right side of the upper surface is engraved after adjustment:

After the right side areas of all surfaces of the product body 10 are engraved, the other group of miniature push rods 904 get close to the right side of the product body 10 along the lower slide rail 8 through the control pulley 901 and clamp the product body 10. At this time, the miniature push rods 904 on the left side of the product body 10 loosen to unclamp and get away through the control pulley 901, and next, the laser device 6 engraves the left side areas 5 of all surfaces of the product body 10.

Finally, smoke will be generated when the surface of the product body 10 is laser-engraved by the laser device 6. At this time, the first fan 11 and the second fan 13 blow downwards, so that the smoke sinks and penetrates through the activated carbon plate 12, and the activated carbon plate 12 adsorbs and filters dust particles in the smoke. The arrangement is beneficial to preventing the smoke from floating upwards and being absorbed by human bodies. Moreover, the activated carbon plate 12 is inserted into the bottom plate 1, which is convenient for later disassembly and replacement of the activated carbon plate 12.

What is claimed is:

1. A visual laser engraving machine, comprising:
   a bottom plate, clamping assemblies and a product body, wherein a portal frame is disposed around a surface of the bottom plate, and a horizontal slide rail is arranged on an inner side of a top of the portal frame;

an electrically controlled pulley is slidably connected with the horizontal slide rail at an inner side of the horizontal slide rail, and longitudinal slide rails are fixed on a bottom of the electrically controlled pulley;

a laser device is slidably connected between the longitudinal slide rails, and an infrared distance meter is arranged on an outer side surface of the laser device;

a lower slide rail is arranged at a middle of the surface of the bottom plate;

the clamping assemblies are slidably connected with the lower slide rail at an inner side of the lower slide rail and are configured for adjusting a height of a surface to be engraved of a product;

each of the clamping assemblies comprises a control pulley, electric push rods, a servo motor and miniature push rods, wherein the electric push rods are fixed on a surface of the control pulley, the servo motor is fixed on tops of the electric push rods, and the miniature push rods are arranged on upper and lower sides of an end of the servo motor; and the product body is placed between the miniature push rods.

2. The visual laser engraving machine according to claim 1,
   wherein the laser device and the infrared distance meter are arranged perpendicular to the bottom plate, and the bottom plate is arranged parallel to all of the horizontal slide rail, the longitudinal slide rails and the servo motors.

3. The visual laser engraving machine according to claim 1, wherein the miniature push rods are symmetrically distributed about a horizontal central axis of the servo motor, and there are totally four miniature push rods provided.

4. The visual laser engraving machine according to claim 1, wherein the product body is rotatably connected to the servo motors through the miniature push rods, and the servo motors are symmetrically distributed about a vertical central axis of the bottom plate.

5. The visual laser engraving machine according to claim 1, wherein the infrared distance meter and the laser device are slidably connected to the longitudinal slide rails and the horizontal slide rail through the electrically controlled pulley, and the infrared distance meter is in clamping connection with the laser device.

6. The visual laser engraving machine according to claim 1, wherein a first fan is arranged on an upper surface of the top of the portal frame, and the top of the portal frame is of a mesh-shaped structure.

7. The visual laser engraving machine according to claim 1, wherein an activated carbon plate is inserted into the bottom plate, and a second fan is arranged at a bottom of the bottom plate.

\* \* \* \* \*